May 29, 1956 R. RUBEGA 2,748,232
LIQUID POTENTIOMETER
Filed March 15, 1955

INVENTOR
ROBERT RUBEGA
BY George Sipkin
Lee J. Hunterger
ATTORNEY

United States Patent Office 2,748,232
Patented May 29, 1956

2,748,232

LIQUID POTENTIOMETER

Robert Rubega, New London, Conn., assignor to the United States of America as represented by the Secretary of the Navy Application March 15, 1955, Serial No. 494,590

10 Claims. (Cl. 201—57)

(Granted under Title 35, U. S. Code (1952), sec. 266)

The invention described herein may be manufactured and used by or for the Government of the United States of America for governmental purposes without the payment of any royalties thereon or therefor.

This invention relates to a liquid potentiometer and, more particularly, to a liquid potentiometer utilizing a lossy dielectric liquid as the resistance element thereof.

The ordinary continuous potentiometer not only has a limited useful life, but in some applications, such as interpolating signals from a plurality of hydrophone sources in a sonar system, it cannot be used because of the excessive noise it generates.

Briefly, this invention contemplates a potentiometer utilizing as a resistance element a liquid with a high resistance, such as alcohol or a mixture of alcohol and hexane. Contact with this liquid resistance can be made noiselessly by moving the "swinger" electrode of the potentiometer through the liquid.

It is therefore an object of this invention to provide a potentiometer which uses a lossy dielectric liquid as the resistance element.

It is a further object of this invention to provide a potentiometer which provides smooth, continuous operation.

It is a still further object of this invention to provide a potentiometer having unlimited useful life.

It is a still further object of this invention to provide a potentiometer incorporating a "swinger" electrode having no direct mechanical contact to cause noise, corrode, weaken or wear.

Figure 1:
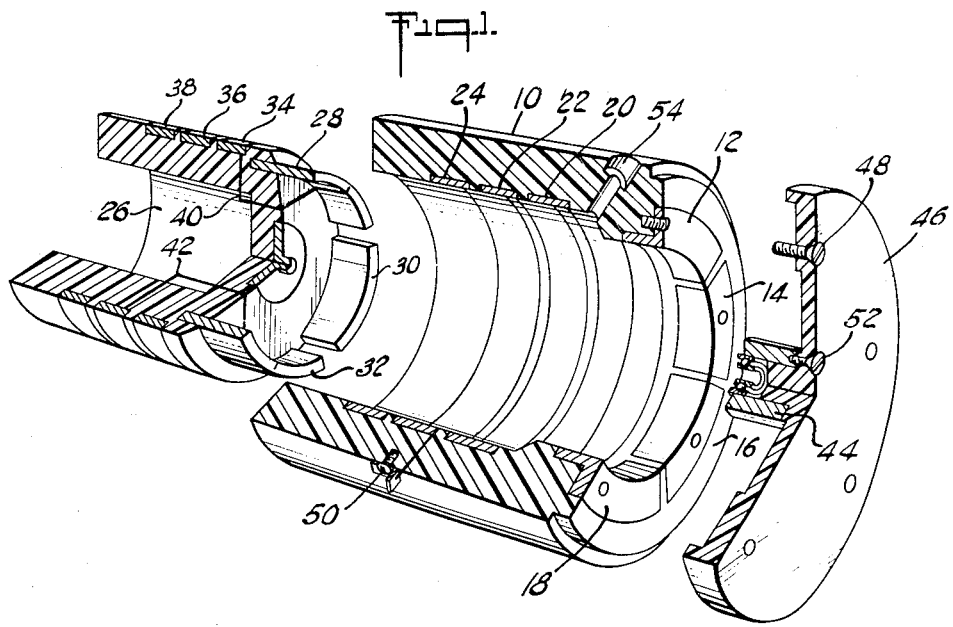
Figure 2:
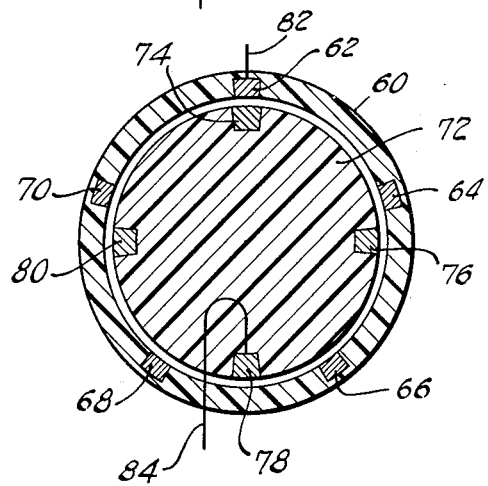

Other objects and many of the attendant advantages of this invention will be readily appreciated as the same becomes better understood by reference to the following detailed description when considered in connection with the accompanying drawings wherein:

Fig. 1 is an exploded view, with a portion thereof broken away to reveal its internal structure, of a preferred embodiment of a potentiometer employing the principles of this invention, and Fig. 2 is a sectional view of a second preferred embodiment of a potentiometer employing the principles of this invention.

Referring now to Fig. 1, there is shown a cylindrical casing 10 which is composed of a non-conducting material, such as plastic or glass. Fixed to casing 10 are a first plurality of stationary electrodes 12, 14, 16 and 18, respectively, which lie on an annular ring, concentric with the cylindrical axis of casing 10, having a given diameter.

Axially spaced from the first plurality of electrodes and from each other is a second plurality of stationary electrodes 20, 22, and 24, respectively, each of which lies on an annular ring, concentric with the cylindrical axis of casing 10, having a given diameter.

Inserted into casing 10 is cylindrical member 26, also composed of a non-conductor such as plastic or glass, which is coaxial with the cylindrical axis of casing 10 and rotatable thereabout. Fixed to cylindrical member 26 is a third plurality of rotatable electrodes 28, 30 and 32, respectively, which lie on an annular ring, concentric with the axis of cylindrical member 26, having a diameter smaller than the given diameter of the annular ring on which lie stationary electrodes 12, 14, 16, and 18. When the potentiometer is assembled, rotatable electrodes 28, 30 and 32 lie in the same axial position as stationary electrodes 12, 14, 16 and 18.

Cylindrical member 26 also has fixed thereto a fourth plurality of rotatable electrodes 34, 36 and 38, respectively, which are axially spaced from rotatable electrodes 28, 30 and 32 and from each other. Each of electrodes 34, 36 and 38 form an annular ring, coaxial with the axis of cylindrical member 26, having a diameter slightly smaller than the annular rings formed by stationary electrodes 20, 22 and 24. When the potentiometer is assembled, electrodes 34, 36 and 38 lie in the same axial position as electrodes 20, 22 and 24.

Each of the rotatable electrodes 28, 30 and 32 is electrically connected to a respective one of the rotatable electrodes 34, 36, and 38 by wires, such as wire 40 connecting electrode 28 to electrode 34 and wire 42 connecting electrode 32 to electrode 36.

Cylindrical electrode 44 is fixed to end member 46, also composed of a non-conducting material such as plastic or glass. When the potentiometer is assembled, cylindrical electrode 44 lies in the same axial position as stationary electrodes 12, 14, 16 and 18 and rotatable electrodes 28, 30, and 32.

Input terminals, such as screw 48, are connected to each of stationary electrodes 12, 14, 16 and 18, respectively; output terminals, such as screw 50, are connected to each of stationary electrodes 20, 22 and 24, respectively; a ground terminal, such as screw 52, is connected to cylindrical electrode 44.

When the potentiometer is assembled all the empty space within casing 10 is filled through fill hole 54 with a lossy dielectric such as isopropyl alcohol or a mixture of isopropyl alcohol and hexane, which provides a resistive element having a relatively low specific conductivity.

In operation, a plurality of inputs from separate sources are applied respectively to stationary electrodes 12, 14, 16 and 18; electrode 44 is connected to a common ground; and the output is taken from electrodes 20, 22 and 24, respectively.

The magnitude of the resistance existing between each of stationary electrodes 12, 14, 16 and 18, respectively, and cylindrical electrode 44 is fixed, and is determined by the specific conductivity of the liquid dielectric, the areas of the electrodes in contact with the liquid dielectric and the distance therebetween.

The magnitude of the resistance existing between each of stationary electrodes 12, 14, 16 and 18, respectively, and each of rotatable electrodes 28, 30 and 32, respectively, depends upon the relative angular positions of these electrodes. The magnitude of resistance between any one of these stationary electrodes and any one of these rotatable electrodes is determined by the proportion of the areas of these two electrodes facing each other, being a minimum when the entire areas of the two electrodes face each other and a maximum when none of the areas of the two electrodes face each other.

The magnitude of the resistance existing between each of rotatable electrodes 28, 30 and 32, respectively, and cylindrical electrode 44 is independent of the relative angular positions between these electrodes.

When an input signal is applied to one of stationary electrodes 12, 14, 16 and 18, current flows across the dielectric liquid to grounded cylindrical electrode 44. A portion of the current flow is collected by one of the rotatable electrodes 28, 30 and 32 when this electrode is facing at least a segment of the stationary electrode to which the input signal is applied. The amount of current collected by this one rotatable electrode is directly proportional to the area of the segment of the one stationary electrode which it faces. As the one rotatable electrode is moved so that it faces segments of each of two adjacent stationary electrodes, it collects from each segment a current which is directly proportional to the area of that segment facing the one rotatable electrode. Therefore, the potentiometer may be used to interpolate between two separate input signals applied to adjacent stationary electrodes.

Stationary electrodes 20, 22 and 24 and rotatable electrodes 34, 36 and 38, respectively, are utilized to extract the output signal appearing on each rotatable electrode 28, 30 and 32, without direct mechanical contact, thereby minimizing noise. Output signals may be obtained across respective load resistances connected between each stationary electrode 20, 22, and 24, and ground. The liquid dielectric has a fixed magnitude of resistance between cooperating stationary electrodes 20, 22 and 24 and rotatable electrodes 34, 36 and 38, which is low relative to the magnitude of the load resistances employed.

Although the potentiometer shown in Fig. 1 is designed for use with a plurality of separate inputs, it can also be constructed with a single input electrode and a single rotatable electrode. In this case each of these two electrodes would have an arcuate extent of no greater than 180 degrees so that the areas of the two electrodes facing each other can be varied from zero to entirety.

Referring now to Fig. 2, there is shown a potentiometer having a cylindrical casing 60, composed of a non-conducting material such as plastic or glass. Fixed to casing 60 is a first plurality of stationary electrodes 62, 64, 66, 68 and 70, each of which is a bar having a relatively small arcuate extent and a relatively large axial extent. Stationary electrodes 62, 64, 66, 68 and 70 are symmetrically disposed about the axis of casing 60 at a given radial distance therefrom. The spacing between adjacent stationary electrodes is large relative to their arcuate extent.

Inserted into casing 60 is cylindrical members 72, also composed of a non-conductor such as plastic or glass, which is coaxial with the axis of casing 60 and rotatable thereabout. Fixed to cylindrical member 72 is a second plurality of rotatable electrodes 74, 76, 78 and 80, respectively. Rotatable electrodes 74, 76, 78 and 80 are also bars having a relatively small arcuate extent and a relatively large axial extent. These rotatable electrodes are symmetrically disposed about the axis of cylindrical member 72 at a radial distance therefrom which is slightly smaller than the radial distance of the stationary electrodes.

The space between cylindrical member 72 and the interior surface of casing 60 is filled with lossy dielectric liquid.

Symbolically shown are wire 82, for applying an input to a stationary electrode, and wire 84, for extracting an output from a rotatable electrode. Actually outputs from each of the rotatable electrodes are obtained through angular ring electrodes identical to stationary electrodes 20, 22 and 24 and rotatable electrodes 34, 36 and 38, shown in Fig. 1.

In operation, each of a plurality of inputs from separate low-impedance sources having a common ground are applied to each of the stationary electrodes. Current flows through the dielectric liquid from each stationary electrode to the stationary electrodes adjacent thereto. A rotatable electrode intermediate two adjacent stationary electrodes will provide as an output an interpolated signal of the two input signals applied respectively to the adjacent stationary electrodes. The relative contribution of each of the two input signals to the interpolated output signal depends on the angular position of the rotatable electrode relative to the two adjacent stationary electrodes, being greater the closer the rotatable electrode is to the stationary electrode to which that input signal is applied.

By constructing the potentiometer of Fig. 2 with only two stationary electrodes spaced 180 degrees from each other and a single rotatable electrode, the potentiometer of Fig. 2 will operate in a similar manner to a conventional continuous potentiometer.

Obviously many modifications and variations of the present invention are possible in the light of the above teachings. It is therefore to be understood that within the scope of the appended claims the invention may be practiced otherwise than as specifically described.

I claim:

1. A liquid potentiometer comprising a liquid-tight casing filled with a lossy dielectric having a given specific resistivity, first, second and third spaced electrodes each having a given area thereof in contact with said liquid, whereby the magnitude of the resistance provided by said liquid existing between any two of said first, second and third electrodes depends upon the orientation of said areas thereof relative to each other, said areas of said first and second electrodes being oriented relative to each other to provide a fixed magnitude of resistance therebetween, and means for varying the orientation of said area of said third electrode relative to said area of said first electrode to vary the magnitude of the resistance therebetween from a given minimum magnitude to a given maximum magnitude, further including fourth and fifth spaced electrodes each having a given area thereof in contact with said liquid, said fourth electrode having a fixed orientation relative to said first electrode and said fifth electrode having a fixed orientation relative to said third electrode, means electrically connecting said fifth electrode directly to said third electrode, and said areas of said fourth and fifth electrodes being oriented relative to each other to provide a fixed magnitude of resistance therebetween.

2. The liquid potentiometer defined in claim 1, further including first, second and third terminals connected respectively to said first, second and fifth electrodes.

3. A liquid potentiometer comprising a liquid-tight casing filled with a lossy dielectric having a given specific resistivity, first, second and third spaced electrodes each having a given area thereof in contact with said liquid, whereby the magnitude of the resistance provided by said liquid existing between any two of said first, second and third electrodes depends upon the orientation of said areas thereof relative to each other, said areas of said first and second electrodes being oriented relative to each other to provide a fixed magnitude of resistance therebetween, and means for varying the orientation of said area of said third electrode relative to said area of said first electrode to vary the magnitude of the resistance therebetween from a given minimum magnitude to a given maximum magnitude, wherein said casing is composed of a cylindrically-shaped high dielectric material; wherein said first electrode is fixed to said casing and said area thereof forms a portion, having an arcuate extent no greater than 180°, of a first annular ring having a first given diameter and which is concentric with the cylindrical axis of said casing; wherein said second electrode is concentric with said first annular ring and said area thereof forms a complete second annular ring having a second given diameter which is smaller than said first given diameter; wherein said third electrode is concentric with said first and second areas of said first and second electrodes and said area thereof forms a portion, having an arcuate extent no greater than 180° of a third annular ring having a given diameter intermediate said first and second given diameters; and wherein said means for varying the orientation of said area of said third electrode comprises means for rotating said third electrode about the cylindrical axis of said casing.

4. The liquid potentiometer defined in claim 3, wherein said first electrode is one of a first given plurality of similar arcuately spaced electrodes all having areas in contact with said liquid which form completely said first annular ring; and wherein said third electrode is one of a second given plurality of similar arcuately spaced electrodes all having areas in contact with said liquid which form completely said third annular ring; and wherein said means for rotating said third electrode comprises means for rotating said second given plurality of electrodes as a unit about the cylindrical axis of said casing.

5. The liquid potentiometer defined in claim 4 further comprising a third given plurality, equal to said second given plurality, of electrodes each of which is fixed to said casing and has an area in contact with said liquid forming a complete annular ring concentric with the cylindrical axis of said casing, and having a third given diameter, said annular rings of said third given plurality of electrodes being axially spaced from each other and from said first annular ring; and a fourth given plurality, equal to said second given plurality, of electrodes in fixed relationship with respect to said second plurality of electrodes each of which is electrically connected directly to a respective one of said second plurality of electrodes and has an area in contact with said liquid forming a complete annular ring concentric with the cylindrical axis of said casing and having a diameter slightly smaller than said third given diameter, each annular ring of said fourth plurality of electrodes being in cooperative relationship with respect to a respective one of said annular rings of said third plurality of electrodes to provide a fixed magnitude of resistance therebetween.

6. The liquid potentiometer defined in claim 5, further including a first plurality of terminals connected respectively to each of said first plurality of electrodes, a second terminal connected to said second electrode, and a third plurality of terminals connected respectively to each of said third plurality of electrodes.

7. A liquid potentiometer comprising a liquid-tight casing filled with a lossy dielectric having a given specific resistivity, first, second and third spaced electrodes each having a given area thereof in contact with said liquid, whereby the magnitude of the resistance provided by said liquid existing between any two of said first, second and third electrodes depends upon the orientation of said areas thereof relative to each other, said areas of said first and second electrodes being oriented relative to each other to provide a fixed magnitude of resistance therebetween, and means for varying the orientation of said area of said third electrode relative to said area of said first electrode to vary the magnitude of the resistance therebetween from a given minimum magnitude to a given maximum magnitude, wherein said casing is composed of a cylindrically-shaped high dielectric material; wherein said first and second electrodes are fixed to said casing, said areas of said first and second electrodes being arcuately spaced relative to each other on a first cylinder coaxial with the cylindrical axis of said casing having a first given diameter, each of said areas of said first and second electrodes having a relatively large given axial extent and a small given arcuate extent, wherein said area of said third electrode lies on a second cylinder coaxial with said first cylinder and oriented in cooperative relationship with said areas of said first and second electrodes, said second cylinder having a second given diameter smaller than said first given diameter and said area of said third electrode having an axial and an arcuate extent substantially equal to that of said areas of said first and second electrodes; and wherein said means for varying the orientation of said area of said third electrode comprises means for rotating said third electrode about the axis of said cylinders.

8. The liquid potentiometer defined in claim 7, wherein said first and second electrodes are two of a first given plurality of similar arcuately spaced electrodes the areas of which are in contact with said liquid and lie on said first cylinder of said first given diameter, and wherein said third electrode is one of a second given plurality of similar arcuately spaced electrodes the areas of which are in contact with said liquid and lie on said second cylinder; and wherein said means for rotating said third electrode comprises means for rotating said second given plurality of electrodes as a unit about the axis of said cylinders.

9. The liquid potentiometer defined in claim 8, further comprising a third given plurality, equal to said second given plurality, of electrodes each of which is fixed to said casing and has an area in contact with said liquid forming a complete annular ring coaxial with said cylinders and having a third given diameter, said annular rings of said third given plurality of electrodes being axially spaced from each other and from said first plurality of electrodes; and a fourth given plurality of electrodes, equal to said second given plurality, of electrodes in fixed relationship with respect to said second plurality of electrodes each of which is electrically connected directly to a respective one of said second plurality of electrodes and has an area in contact with said liquid forming a complete annular ring coaxial with said cylinders and having a diameter slightly smaller than said third given diameter, each annular ring of said fourth plurality of electrodes being in cooperative relationship with respect to a respective one of said annular rings of said third plurality of electrodes to provide a fixed magnitude of resistance therebetween.

10. The liquid potentiometer defined in claim 9, further including a first plurality of terminals connected respectively to each of said first plurality of electrodes, and a second plurality of terminals connected respectively to each of said third plurality of electrodes.

References Cited in the file of this patent

UNITED STATES PATENTS

| | | |
|---|---|---|
| 2,067,467 | Urfer | Jan. 12, 1937 |
| 2,271,531 | Minor | Feb. 3, 1942 |
| 2,649,526 | Benchemoul | Aug. 18, 1953 |